(12) United States Patent
Chen

(10) Patent No.: US 12,281,719 B2
(45) Date of Patent: Apr. 22, 2025

(54) WATER HAMMER EFFECT MITIGATION CONTROLLING DEVICE OF SOLENOID VALVE FOR FLUID

(71) Applicant: Lee-Fei Chen, Taipei (TW)

(72) Inventor: Lee-Fei Chen, Taipei (TW)

( * ) Notice: Subject to any disclaimer, the term of this patent is extended or adjusted under 35 U.S.C. 154(b) by 81 days.

(21) Appl. No.: 18/140,601

(22) Filed: Apr. 27, 2023

(65) Prior Publication Data

US 2024/0361784 A1  Oct. 31, 2024

(51) Int. Cl.
| | |
|---|---|
| F16K 31/06 | (2006.01) |
| F16K 47/02 | (2006.01) |
| F16L 55/055 | (2006.01) |
| G05D 7/06 | (2006.01) |

(52) U.S. Cl.
CPC ...... F16K 31/0686 (2013.01); F16K 31/0696 (2013.01); F16K 47/02 (2013.01); F16L 55/055 (2013.01); G05D 7/0635 (2013.01)

(58) Field of Classification Search
CPC .... F16K 31/0696; F16K 47/02; F16K 47/023; F16L 55/055; G05D 7/0635
See application file for complete search history.

(56) References Cited

U.S. PATENT DOCUMENTS

| | | | | |
|---|---|---|---|---|
| 2004/0074318 | A1* | 4/2004 | DiTrolio | B01L 3/0213 73/864.15 |
| 2005/0241697 | A1* | 11/2005 | Ohmi | F16L 55/043 137/487.5 |
| 2012/0175001 | A1* | 7/2012 | Nishio | F16K 31/1262 137/625.33 |
| 2014/0305525 | A1* | 10/2014 | Le Moing | F16K 37/0083 137/553 |
| 2023/0077700 | A1* | 3/2023 | Yen | F02M 25/0836 123/520 |

* cited by examiner

*Primary Examiner* — Atif H Chaudry
(74) *Attorney, Agent, or Firm* — Hershkovitz & Associates, PLLC; Abe Hershkovitz

(57) ABSTRACT

The water hammer effect mitigation controlling device of solenoid valve for fluid of the present invention includes a controller and a solenoid valve. The controller generates and transmits a control signal to the solenoid valve when receiving a closing command. The control signal includes alternatively arranged multiple closing and open signal intervals. The time duration of the closing signal interval is shorter than the closing reaction time of the solenoid valve, the closing distance of the valve body during each closing signal interval is larger than an opening distance during each open signal interval, and the valve body is switched to a closed state during the control signal. The opened-closed switching time is prolonged by multiple closing and open signal intervals, and the water hammer effect caused by suddenly closing the valve body is reduced with no extra hardware, giving the present invention the advantage of lowered cost.

6 Claims, 4 Drawing Sheets

WATER HAMMER EFFECT MITIGATION CONTROLLING DEVICE OF SOLENOID VALVE FOR FLUID

BACKGROUND OF THE INVENTION

1. Field of the Invention

The present invention relates to a controlling device of a solenoid valve for fluid, and more particularly to a water hammer effect mitigation controlling device of a solenoid valve for fluid.

2. Description of the Related Art

A solenoid valve for fluid (hereinafter referred to as the solenoid valve) is used to control the flow of fluid in a pipeline. A common solenoid valve usually includes an inlet port, an outlet port, a fluid channel, a valve body, a spring, and a coil. The fluid channel connects the inlet port and the outlet port, and the valve body is disposed in the fluid channel and switches between a blocking position and a non-blocking position. The coil is disposed around the valve body and controls the valve body to be in the blocking position or the non-blocking position by turning on or off the current. For example, when no current is running through the coil, the spring presses the valve body to the blocking position; when current is running through the coil, the magnetic field generated drives the valve body to move to the non-blocking position, and the spring is compressed.

When the solenoid valve that controls the flowing fluid is switched from open to closed, the fluid flowing in the pipeline is forced to stop in a very short period of time. The inertia causes the fluid to be squeezed forward, resulting in a surge in fluid pressure in front of the valve body. The suddenly increased fluid pressure rebounds after hitting the valve body and propagates backward along the pipeline, forming a pressure wave in the pipeline and produces sound. This is called the water hammer effect. The water hammer effect often occurs in household appliances such as washing machines and dishwashers that need to control the water inlet, and in water supply pipelines in buildings, resulting in unexplained collision sounds in houses or buildings. Long-term damage to the pipeline also tends to take place due to repeating sudden pressure changes.

To address the water hammer effect, a common solution is to install a water hammer absorber near the solenoid valve. For example, an air pressure water hammer absorber includes a piston and an air chamber formed by the piston. When the pressure wave caused by the sudden closure of the solenoid valve propagates to the position of the air pressure water hammer absorber, the piston is pushed by the pressure wave, compressing the air chamber, and providing buffering effect to absorb the pressure wave and reduce its propagation in the pipeline.

However, the installation of a water hammer absorber requires additional modifications to the pipeline, which increases the overall installation cost. Moreover, if the specifications and installation location of the water hammer absorber are not appropriate or do not match the environmental factors such as the thickness of the pipeline or the fluid flow rate, the effect of the absorber may not be good enough. Additionally, the spring in the absorber may rust over time and get stuck, reducing the absorption effect.

To sum up, the conventional technique for mitigating water hammer effect needs to be improved.

SUMMARY OF THE INVENTION

An objective of the present invention is to provide a controlling device of a solenoid valve for fluid that can effectively mitigate the water hammer effect.

To achieve the foregoing objective, the water hammer effect mitigation controlling device of a solenoid valve for fluid includes:

a solenoid valve, including a valve body having a closing reaction time;

a controller, electrically connected to the solenoid valve, generating and sending a control signal to the solenoid valve; wherein when the controller receives a closing command, the control signal includes multiple closing signal intervals and multiple open signal intervals, and the time duration of each closing signal interval is shorter than the closing reaction time; wherein the closing distance of the valve body during each closing signal interval is larger than the opening distance during each open signal interval, and the valve body is switched to a closed state from the opened state according to the control signal.

The present invention utilizes the control signal of the controller to control the valve body. The valve body of the solenoid valve moves from the opened state toward the closed state during the time period of the closing signal intervals, and moves in the opposite direction during the time period of the open signal intervals, which is from the closed state toward the opened state. The "closing reaction time" refers to the time required by the valve body to move from completely opened state to completely closed state when the solenoid valve receives a control signal with a continuous closing signal interval. Since the closing signal interval in the control signal is shorter than the closing reaction time, the valve body will not switch from completely opened state to completely closed state in one closing signal interval. When the solenoid valve receives the control signal, the valve body first performs a closing distance during the closing signal interval, followed by an opening distance during a subsequent open signal interval. The operation repeats. Since the closing distance during each closing signal interval is longer than the opening distance during each open signal interval, after multiple closing signal intervals and open signal intervals, the valve body gradually switches from a fully opened state to a fully closed state in stages. Since the control signal consists of multiple closing signal intervals and open signal intervals, the overall duration of the control signal is inevitably longer than the closing reaction time of the valve body.

The water hammer effect mitigation controlling device of a solenoid valve for fluid of the present invention has the following advantages. First of all, the controller controls the valve body to gradually switch to closed state within the time period of the control signal, such that the reaction time of the valve body switching from the opened state to closed state is prolonged, and the original flowing fluid is cut off gradually rather than being cut off suddenly in a short time period. As a result, the pressure surge close to the solenoid valve and the water hammer effect is avoided.

In addition, the implementation of the present invention does not require installation of additional hardware device, such as a water hammer absorber, in the pipeline system. It also does not require replacing the solenoid valve or amending the voltage or current levels of the closing and open signal intervals, which may also lead to changing the hardware specification of the controller. The present invention achieves the goal of mitigating water hammer effect by controlling the firmware or software of the controller to generate control signal that includes specific time intervals of the closing signal and open signal intervals. This approach has low cost and no usage time limit, effectively overcoming the problems of existing water hammer absorber technologies.

Other objectives, advantages and novel features of the invention will become more apparent from the following detailed description when taken in conjunction with the accompanying drawings.

DETAILED DESCRIPTION OF THE INVENTION

Figure 1:
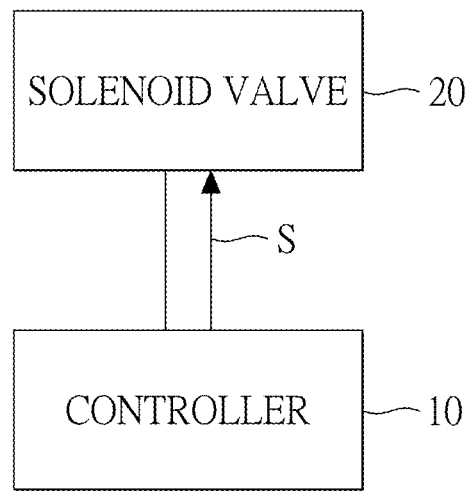
FIG. 1 is a block diagram of the water hammer effect mitigation controlling device of a solenoid valve for fluid of the present invention.

With reference to FIG. 1, the water hammer effect mitigation controlling device of a solenoid valve 20 for fluid of the present invention includes a controller 10 and a solenoid valve 20. The controller 10 is electrically connected to the solenoid valve 20, so as to generate and transmit a control signal S to the solenoid valve 20.

Figure 2A:
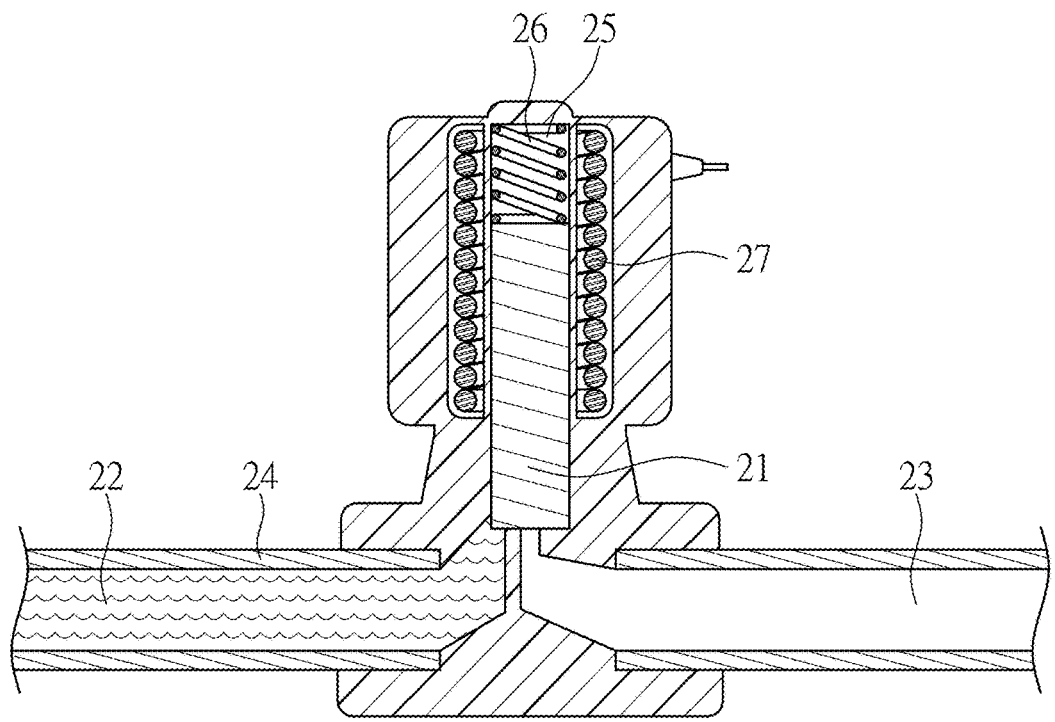
FIG. 2A is a cross sectional view of the water hammer effect mitigation controlling device of a solenoid valve for fluid of the present invention while the solenoid valve is at closed state.

With reference to FIG. 2A, the solenoid valve 20 mainly includes a valve body 21, an inlet port 22, an outlet port 23, and a fluid channel 24. The fluid channel 24 connects the inlet port 22 and the outlet port 23, and includes a valve body chamber 25. The valve body 21 is movably disposed in the valve body chamber 25, and is switchable between a mechanical closed state (hereinafter referred to as "closed state") and a mechanical opened state (hereinafter referred to as "opened state").

The valve body 21 may be a piston. When the valve body 21 is at the closed state, the valve body 21 blocks the fluid channel 24 between the inlet port 22 and the outlet port 23, such that the fluid cannot flow from the inlet port 22 to the outlet port 23. When the valve body 21 is at the opened state, the valve body 21 does not block between the inlet port 22 and the outlet port 23, such that the fluid can flow from the inlet port 22 to the outlet port 23.

In some solenoid valve 20, the opened state and the closed state of the valve body 21 are controlled by a spring 26 and a coil 27. The spring 26 is connected to the valve body 21, and the tension of the spring 26 presses the valve body 21 toward the closed state or the opened state. The coil 27 is mounted around the valve body chamber 25, and is electrically connected to the controller 10 to receive the control signal S. The coil 27 provides a magnetic force in an opposite direction to the tension of the spring 26, which pushes the valve body 21 toward the opened state or the closed state.

Figure 2B:
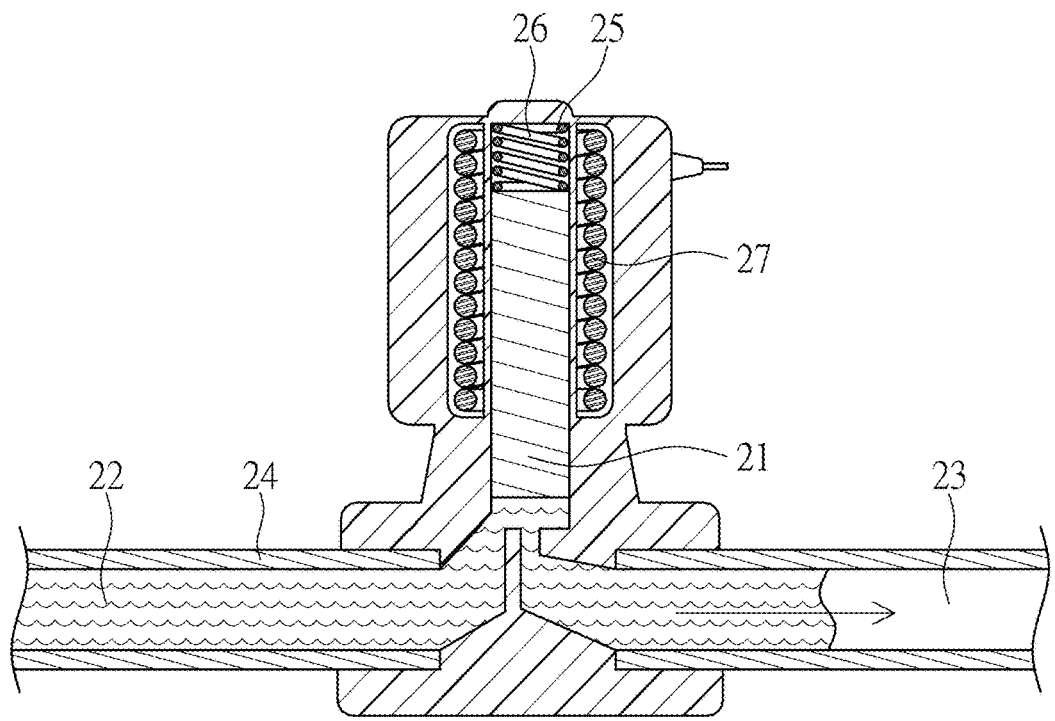
FIG. 2B is a cross sectional view of the solenoid valve of the water hammer effect mitigation controlling device of a solenoid valve for fluid of the present invention while the solenoid valve is at opened state.

Take a normally-closed solenoid valve 20 as an example. With reference to FIG. 2A, in a normally closed solenoid valve 20, the relative position of the spring 26 and the valve body 21 causes the spring 26 to press the valve body 21 towards the closed state. Therefore, when the control signal S is a low voltage signal or zero current signal, no current passes through the coil 27, no magnetic field is generated and no magnetic force is provided, and the valve body 21 is held in the closed state by the spring 26. As shown in FIG. 2B, when the control signal S is a high voltage signal or a high current signal, current flows through the coil 27, generating a magnetic field and providing magnetic force that attracts the valve body 21 towards the opening direction, causing the valve body 21 to switch to the open state.

On the other hand, in a normally-opened solenoid valve 20 (not shown in the figure), the relative position of the spring 26 and the valve body 21 causes the spring 26 to press the valve body 21 towards the open state. When the control signal S is at the low voltage signal or the zero current signal, no current passes through the coil 27, no magnetic field is generated and no magnetic force is provided. The valve body 21 is held in the opened state by the spring 26. When the control signal S is the high voltage signal or the high current signal, current flows through the coil 27, generating a magnetic field and providing a magnetic force that attracts the valve body 21 towards the closed direction, causing the valve body 21 to switch to the closed state.

Figure 3A:
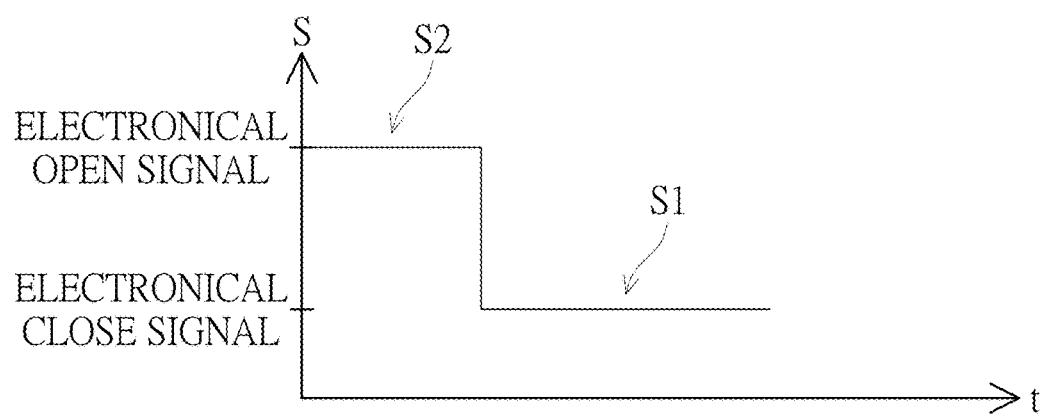
FIG. 3A is a wave diagram of a control signal for the solenoid valve.
Figure 3B:
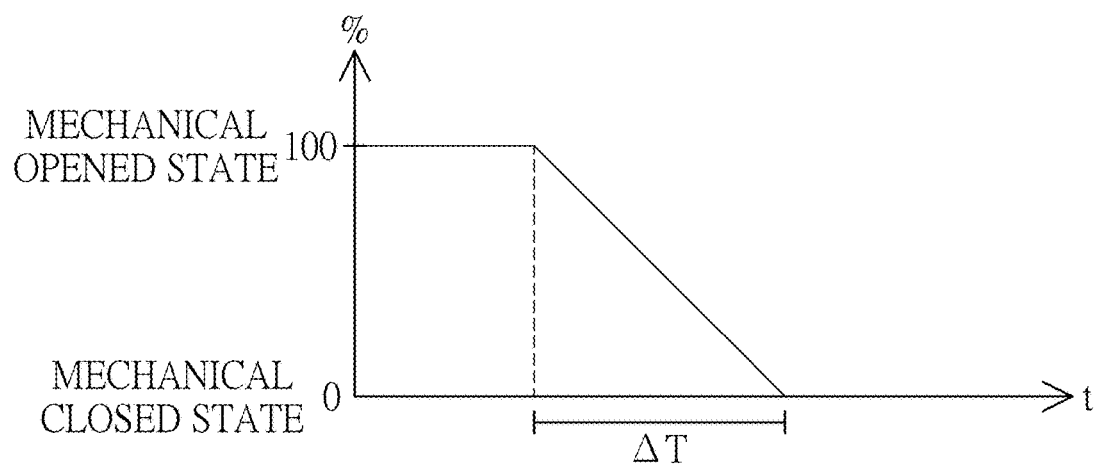
FIG. 3B is a displacement graph of the valve body in the solenoid valve switching from opened state to closed state.

With reference to FIG. 3A and FIG. 3B, in the present invention, a section of the control signal S that keeps the valve body 21 of the solenoid valve 20 at the closed state or drive the valve body 21 from the opened state to closed sate is defined as a "electronical closing signal interval (hereinafter referred to as "closing signal interval") S1". On the contrary, a section of the control signal S that keeps the valve body 21 of the solenoid valve 20 at the opened state or drive the valve body 21 from the closed state to opened sate is defined as an "electronical open signal interval (hereinafter referred to as "open signal interval") S2". Furthermore, the valve body 21 of the solenoid valve 20 has a "closing reaction time ΔT". When the coil 27 of the solenoid valve 20 receives a continuous closing signal interval S1, the valve body 21 will switch from a completely opened state to a completely closed state. Namely, the closing reaction time ΔT is the time required for the valve body 21 to switch from completely opened state to completely closed state. A closing reaction time ΔT of a common solenoid valve 20 is 30 ms (millisecond)–2 s (second).

The definition of the above-mentioned closing signal interval S1 and open signal interval S2 applies to both normally opened solenoid valve and normally closed solenoid valve. The difference between a normally opened solenoid valve and normally closed solenoid valve is that when the control signal from the controller is a low voltage signal or zero current signal, and no current flows through the coil of the solenoid valve, the valve body of the normally opened solenoid valve is at the opened state, and the valve body of the normally opened solenoid valve is at the closed state.

When the valve body 21 of the solenoid valve 20 is at the opened state and the controller 10 receives a closing command, the controller 10 generates and transmits the control signal S to the solenoid valve 20. The present invention can be applied to devices such as washing machines or dishwashers that require controlling of water inlet timing. The controller 10 can be a solenoid valve control component of the main control board of a washing machine or a dishwasher, and the closing command can be generated by a main control processor of the main control board according to the washing or dishwashing program. In addition, the present invention can also be applied to the solenoid valve 20s of water pipes or other pipelines for fluid in buildings, and the controller 10 can be connected to a central control panel to receive the closing command.

Figure 4A:
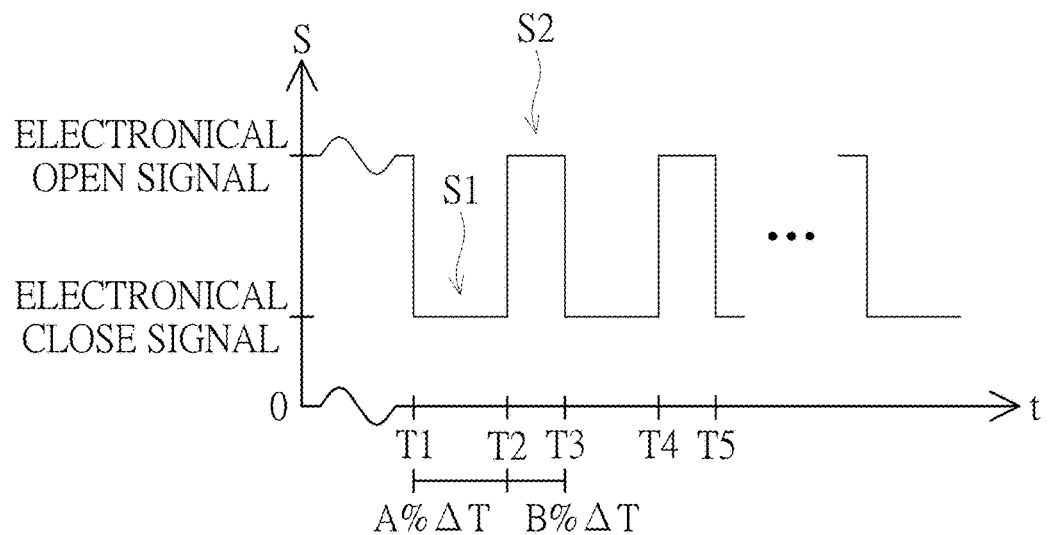
FIG. 4A is a wave diagram of a control signal of a water hammer effect mitigation controlling device of a solenoid valve for fluid of the present invention.
Figure 4B:
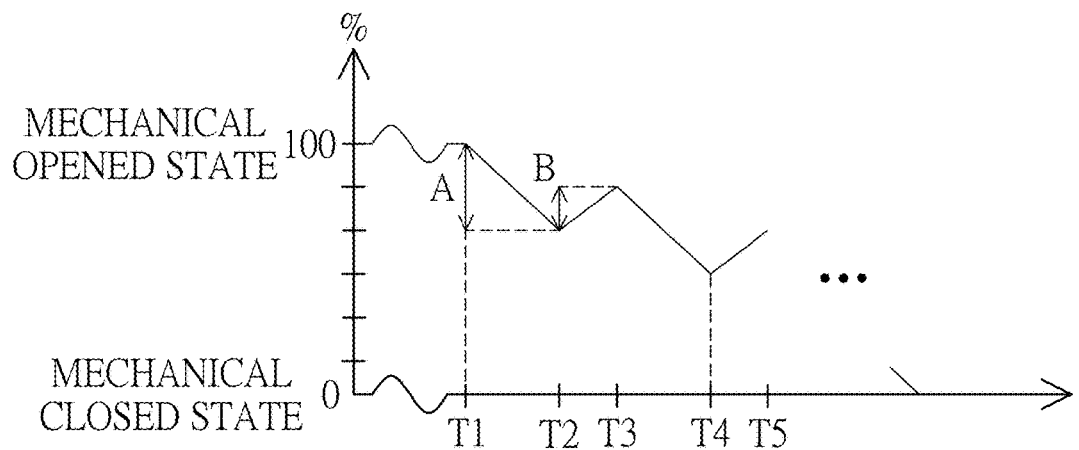
FIG. 4B is a displacement graph of the valve body in the water hammer effect mitigation controlling device of a solenoid valve for fluid of the present invention switching from opened state to closed state.

With reference to FIG. 4A and FIG. 4B, wherein FIG. 4A is the control signal S that the controlled outputs according to the closing command, and FIG. 4B is the displacement-time graph of the valve body 21 moving from the opened state to the closed state. According to the closing command, the controller 10 generates the control signal S including multiple alternatively arranged closing signal intervals S1 and multiple open signal intervals S2, while the time duration of each closing signal interval S1 is shorter than the closing reaction time $\Delta T$ of the valve body 21. Furthermore, the closing distance of the valve body 21 during each closing signal interval S1 is larger than the opening distance during each open signal interval S2. To be specific, the closing distance mentioned above is the distance that the valve body 21 moves toward the closed sate, and the opening distance is the distance that the valve body 21 moves toward the opened state. Therefore, after an adjacent closing signal interval S1 and the open signal interval S2, the total displacement of the valve body 21 is toward the closed state, and the valve body 21 is switched to the closed state from the opened state after the completed control signal S. A practical example is described below.

To simplify the illustration, we assume the moving speed of the valve body 21 during the closing signal interval S1 is the same as the moving speed during the open signal interval S2, and the valve body 21 moves at a constant speed in closing signal interval S1 and open signal interval S2. Namely, if the time duration of a closing signal interval S1 is the same as an open signal interval S2, the distance of the closing distance of the valve body 21 will be the same as the opening distance, and the valve body 21 returns to the same location. It is also clear that if the time duration of a closing signal interval is longer than the closing reaction time $\Delta T$, the valve body 21 will move from completely opened state to the completely closed state, moving a complete closing distance (100% closed).

With reference to FIGS. 4A and 4B, before time point T1, the controller 10 outputs open signal interval S2 and the valve body 21 is kept in the completely opened state (100% opened). At time point T1, the controller 10 receives the closing command and starts outputting the control signal S. Between time points T1 and T2, the time duration of the closing signal interval S1 is A % of the closing reaction time $\Delta T$, and the closing distance of the valve body 21 is A % of the completely closing distance (A % closed). Between time points T2 and T3, the time duration of the open signal interval S2 is B % of the closing reaction time $\Delta T$, and the opening distance of the valve body 21 is B % of the complete opening distance (B % opened). Since A %>B %, the total displacement of the valve body 21 is (A−B) % toward the closed state, that is, (A−B) % closed. T1-T3 can be deemed as one of the cycles of the control signal S.

In an embodiment, in each cycle, the time duration of the closing signal interval S1 is A % of the closing reaction time $\Delta T$, and the time duration of the open signal interval S2 is B % of the closing reaction time $\Delta T$. Namely, the ration between the time duration of the closing signal interval S1 and the open signal interval S2 is the same.

In this way, the valve body 21 switches from the open state to the closed state after (100/(A−B)) cycles, and the time used is (A+B)/(A−B) times the closing reaction time $\Delta T$, assuming that (100/(A−B)) and (A+B)/(A−B) are both integers. For example, if A %=20% and B %=10%, and a total of 10 cycles are performed between time T1 and T21, the valve body 21 will complete 100% of the closing distance and switch from the completely opened state to the completely closed state, and the time used is 3 times the closing reaction time $\Delta T$. In reality, the valve body 21 will reach the completely closed state for the first time in the 9th cycle, and the 10th cycle can be regarded as a buffer time period, in which the valve body 21 opens 10% in the 9th cycle, then closes to 100% in the 10th cycle again. The water pressure is released shortly before entering a long-term completely closed state, improving the effect of reducing water hammer.

Preferably, the control signal S with the multiple closing signal intervals S1 and open signal intervals S2 are generated with pulse width modulation (PWM) control method. For example, before the time point T1, the controller 10 outputs 100% of the open signal interval S2. When the controller 10 receives the closing command, the controller 10 outputs a pulse width modulation control signal S with a cycle of (A+B)$\Delta T$, where the closing signal interval S1 has a duty cycle of A/(A+B) %, and the open signal interval S2 has a duty cycle of B/(A+B) %.

In another embodiment, the duty cycle of the closing signal intervals S1 in the cycles may be different, and relatively, the duty cycle of the open signal intervals S2 in the cycles is different. The basic term is that the closing distance in each closing signal interval S1 is larger than the opening distance in each open signal interval S2; on the other hand, while under the assumption that the closing speed is equal to the opening speed of the valve body 21, the basic term may be the duration of each closing signal interval S1 is larger than each open signal interval S2. As a result, the controlling device achieves the goal of closing the valve body 21 of the solenoid valve 20 gradually in a staged manner in multiple cycles of the control signal S.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A water hammer effect mitigation controlling device of a solenoid valve for fluid, the water hammer effect mitigation controlling device of a solenoid valve for fluid being configured to be applied to one of, a washing machine or a dishwasher, and the water hammer effect mitigation controlling device of a solenoid valve for fluid comprising:
   a solenoid valve, including a valve body having a closing reaction time;
   a controller, electrically connected to the solenoid valve, generating and sending a control signal to the solenoid valve; wherein when the controller receives a closing command, the control signal includes alternatively arranged multiple closing signal intervals and multiple open signal intervals, and a time duration of each closing signal interval is shorter than the closing reaction time; wherein a closing distance that the valve body moves toward a closed state during each closing signal interval is larger than an opening distance that the valve body moves toward an opened state during each open signal interval, and the valve body is switched to the closed state from the opened state according to the control signal; wherein as soon as the valve body reaches a fully closed state for a first time in one said closing signal interval, then in the following open signal interval, the valve body is controlled to open at a final percentage, and then in the following closing signal interval, the valve body is controlled to reach the fully closed state for a second time; and wherein the closing reaction time is the time required for the valve body to switch from a fully open state to the fully closed state, and the water hammer effect mitigation controlling device of a solenoid valve for fluid is applied to a washing machine or a dishwasher that requires controlling of water inlet timing.

2. The water hammer effect mitigation controlling device as claimed in claim 1, wherein the time duration of each closing signal interval is longer than a time duration of the open signal interval.

3. The water hammer effect mitigation controlling device as claimed in claim 1, wherein the control signal is generated with pulse width modulating control method.

4. The water hammer effect mitigation controlling device as claimed in claim 1, wherein the solenoid valve includes:
an inlet port;
an outlet port;
a fluid channel, connecting the inlet port and the outlet port, and including a valve body chamber; wherein the valve body is movably disposed in the valve body chamber and is switchable between the closed state and the opened state;
a coil, disposed around the valve body chamber and electrically connected to the controller to receive the control signal.

5. The water hammer effect mitigation controlling device as claimed in claim 1, wherein the closing signal interval is a high-voltage signal or a high-current signal, and the open signal interval is a low-voltage signal or a zero-current signal.

6. The water hammer effect mitigation controlling device as claimed in claim 1, wherein the closing signal interval is a low-voltage signal or a zero-current signal, and the open signal interval is a high-voltage signal or a high-current signal.

* * * * *